United States Patent [19]

Harvey

[11] Patent Number: 5,075,705

[45] Date of Patent: Dec. 24, 1991

[54] METHODS OF AN APPARATUS FOR PROVIDING PRINTED PHOTOGRAPHS WITH A BORDER

[75] Inventor: Donald M. Harvey, Webster, N.Y.

[73] Assignee: Eastman Kodak Company, Rochester, N.Y.

[21] Appl. No.: 628,040

[22] Filed: Dec. 17, 1990

[51] Int. Cl.[5] .............. G03B 17/24

[52] U.S. Cl. .............. 354/106; 354/222

[58] Field of Search .............. 354/105, 106, 109, 222

[56] References Cited

U.S. PATENT DOCUMENTS

| | | | |
|---|---|---|---|
| 1,777,904 | 10/1930 | Tucker . | |
| 2,516,718 | 7/1950 | Oriol | 95/1.1 |
| 3,029,717 | 4/1962 | Hildebrandt | 95/1.1 |
| 4,361,388 | 11/1982 | Mlcak et al. | 354/106 |
| 4,427,279 | 1/1984 | Edelstein et al. | 354/107 |
| 4,705,372 | 11/1987 | Lapeyre | 354/106 |

*Primary Examiner*—M. L. Gellner

*Attorney, Agent, or Firm*—Millen, White & Zelano

[57] ABSTRACT

An image in a printed photograph is provided with a border for writing by fogging the border of the negative frame from which the printed photograph is prepared after the frame is exposed to the image by opening a camera shutter. Fogging is performed by an electrical illumination source positioned downstream of the camera shutter and energized upon winding the filmstrip including the frame on a take-up spool. A switch is provided for fogging selected frames. In accordance with one embodiment of the invention, the switch reduces the height of the field in the view finder of the camera.

26 Claims, 3 Drawing Sheets

METHODS OF AN APPARATUS FOR PROVIDING PRINTED PHOTOGRAPHS WITH A BORDER

FIELD OF THE INVENTION

The instant invention is directed to methods of and apparatus for providing printed photographs with a border; more particularly, the instant invention relates to methods of and apparatus for providing printed photographs with a single white border for written information.

BACKGROUND OF THE INVENTION

It is frequently desirable to place written information on the face of photographic prints. The back surfaces of photographic prints do not readily take ink and smear easily. Moreover, writing on the back surface of prints is not visible in albums. It is frequently desirable to record information on photoprints while memory of having taken the picture is still fresh. Many people do not place their prints in photo albums immediately and sometimes wait years before placing prints in albums. By that time, their memories have faded. Moreover, albums with clear plastic covers are difficult to write on so one must frequently write on the adhesive backing which retains the photoprints in place or on labels secured to plastic covers, neither of which is particularly satisfactory.

A good solution to the problem is to incorporate a narrow single white border approximately ⅜" in width along the bottom edge of the photoprints. This allows written information to appear on the face of the photoprint. Preferably the size of the photoprint should remain the same, and photoprint should be photofinisher transparent.

It is also desirable that the border be provided optionally, so as to be selectable by a user with only selected prints being provided with a border. For example, one might select only the initial print in a series so that the remaining prints each have the full width of a standard print.

The patent literature includes a number of references in which exposing the edge of a film frame to recorded data is disclosed. However, the concept of an operator-controlled, still camera system for selectively fogging the edge of an image to provide a space for writing thereon is not taught by the prior art.

Among the expired patents of interest is U.S. Pat. No. 1,777,904 to Tucker. Tucker discloses a system which allows an operator to write on the film negative while the negative is in the camera. This is accomplished by writing on a translucent or transparent surface through which the film edge is exposed to thereby imprint the written image on the negative as a band on the edge of a frame is exposed. Tucker does not teach how one would configure contemporary cameras to provide borders for photoprints made from negatives exposed in contemporary cameras.

Other expired patents include U.S. Pat. No. 2,516,718 to Oriol and U.S. Pat. No. 3,029,717 to Hildebrandt. Oriol discloses a system for fogging the edge of a film negative in a motion picture camera outside the image area. The disclosed approach is not readily adaptable to the structure of still cameras and does not provide the selectivity desirable in using a fogging techniques in a still camera. Hildebrandt utilizes fiber optics as a light source to expose the edge of a film frame as it is transported through a camera. In this system, however, the exposure occurs in the form of a dot code, in contrast to a band formed along the film edge by fogging or exposure Recently issued patents also address the problem of marking filmstrips. U.S. Pat. No. 4,361,388 to Micak exposes the edge of a film frame using a method in which the camera operator controls the exposure which is in the form of data from a luminous data source. U.S. Pat. No. 4,705,372 to Lapeyre exposes the edge of a film as the film is transported with respect to an LED array to record data on the film, while U.S. Pat. No. 4,427,279 to Beddlestein et al. is representative of a relatively large number of devices which, through dual or single exposure, permit the combination of a photograph and identification data.

In view of the aforementioned prior art approaches, there is a need for methods of and apparatus for producing photoprints having borders upon which information can be readily written.

SUMMARY OF THE INVENTION

It is an object of the instant invention to provide new and improved methods of and apparatus for providing photoprints with a border area on the front face thereof upon which information may be readily written.

In view of these objects and other objects the instant invention is directed a still camera which sequentially exposes frames of a negative filmstrip to selectively create a border area thereon. The camera comprises a light-tight film exposure compartment having a lens for focusing images on the frames of the filmstrip and a shutter disposed between the lens and filmstrip for exposing the filmstrip to the image. The filmstrip is indexed with respect to the light-tight film exposure compartment as individual frames are exposed. As the filmstrip is indexed, a portion of the filmstrip is fogged with light subsequent to exposing the filmstrip to the image so as to provide a border area proximate an edge of the filmstrip, which border appears on prints made from the filmstrip.

In accordance with a preferred embodiment, the fogging is performed outside of and downstream from the film exposure compartment.

In a more specific aspect of the invention, the fogging operation is accomplished by a mask with an aperture therethrough of a width substantially equal to the width of the border area, through which aperture illumination source shines. The illumination source is electrically energized to provide white light to fog the border area.

The invention is further conceptualized as an apparatus for providing a border proximate the edge of an image on a photographic print developed from frames of negative filmstrips exposed proximate a light-tight compartment of a camera. The apparatus comprises a mask with an aperture positioned outside of the light-tight compartment; an illumination source aligned with the aperture of the mask and being shielded from the light-tight compartment, and an arrangement for selectively energizing the illuminating source to fog the image on the negative filmstrip as the filmstrip advances past the aperture in the mask.

A method embodying the invention facilitates providing frames of a negative filmstrip within a camera with a border area which in turn provides an equivalent border area on photographic prints made therefrom. In practicing the method, at least one frame of the negative filmstrip is exposed to a viewed image to create an exposed negative frame with the viewed image thereon. Thereafter, while the filmstrip is being advanced, the exposed negative frame is selectively fogged along a portion thereof adjacent an edge thereof to create the border area thereon.

BRIEF DESCRIPTION OF THE DRAWINGS

Various other objects, features, and attendant advantages of the present invention will be more fully appreciated as the same becomes better understood when considered in conjunction with the accompanying drawings, in which like reference characters designate the same or similar parts throughout the several views and wherein.

DETAILED DESCRIPTION

1. Photoprints and Negative Film Strip (FIGS. 1, 2 and 3)

Figure 1:
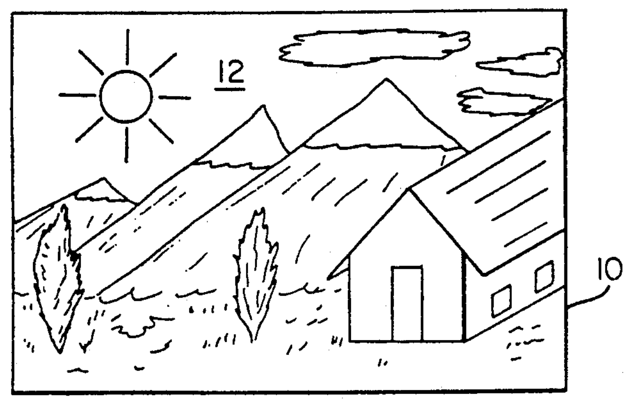
FIG. 1 is a planar view of the normal borderless photoprint in accordance with the prior art.
Figure 2:
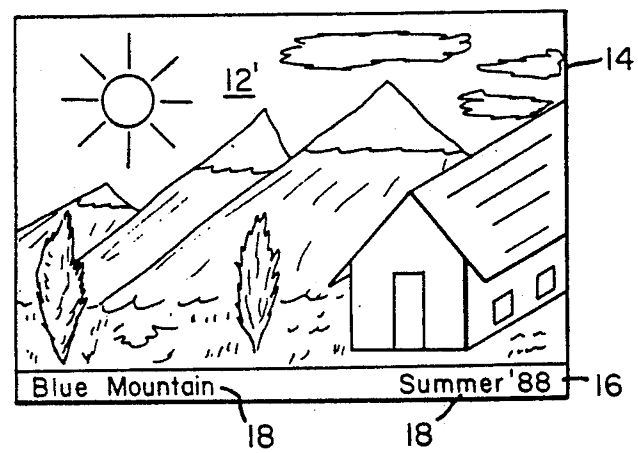
FIG. 2 is a view similar to FIG. 1, but with the photoprint being provided with a white border upon which information may be conveniently written.
Figure 3:
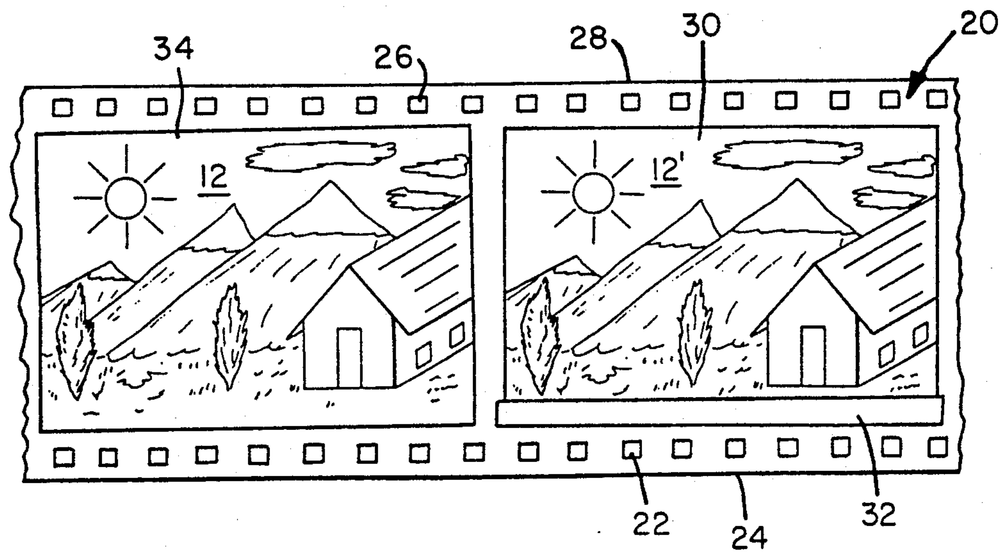
FIG. 3 is a planar view of a negative filmstrip with a selected one of the images having a white light, fogged area superimposed over a bottom portion of the image.

Referring now to FIGS. 1, 2, and 3, FIG. 1 shows a normal borderless print 10 having an image 12 thereon. With a normal borderless print, there is no place on the front face of the print to write other than on the image 12. FIG. 2 illustrates a print 14 made from a negative exposed in accordance with the principles of the instant invention, wherein a white border 16 is provided on which information 18 may be printed by the customer for whom the print was developed. The print 14 is the same size as the print 10. For example, the prints 10 and 14 might have a total width of 3½" and a length of 5", however, the white border 16 of print 14 has a width preferably of 5/16" to ⅜", which width is taken from the image 12. The image 12 in both prints is the same; however, the image 12 in print 14 has a bottom portion removed to a width equal to the border area 16.

Referring now to FIG. 3, there is shown a negative filmstrip, designated generally by the numeral 20, having a line of sprocket holes 22 adjacent the bottom edge 24 thereof and a line of sprocket holes 26 adjacent the top edge 28 thereof. The negative image 12' on Frame 30 has its width reduced slightly by the white light fogged area 32, which, on the negative, has a width of approximately 100 mils or 1/10". As can be seen by comparing the image 12' of frame 30 with the image 12 of frame 34, the white light fogged area 32 is inboard of the line of sprocket holes 22 and superimposed over the image 12 after the image has been formed on the negative. In accordance with the principles of the invention, the image 12 is formed first, and whether the resulting print will be a borderless print 10, as is shown in FIG. 1, or a bordered print 14, as is shown in FIG. 2, is determined by selectively applying white light to form the fogged area 32 on selected frames of the negative filmstrip 20.

2. Structure and Operation of Still Camera (FIGS. 4–6)

Figure 4:
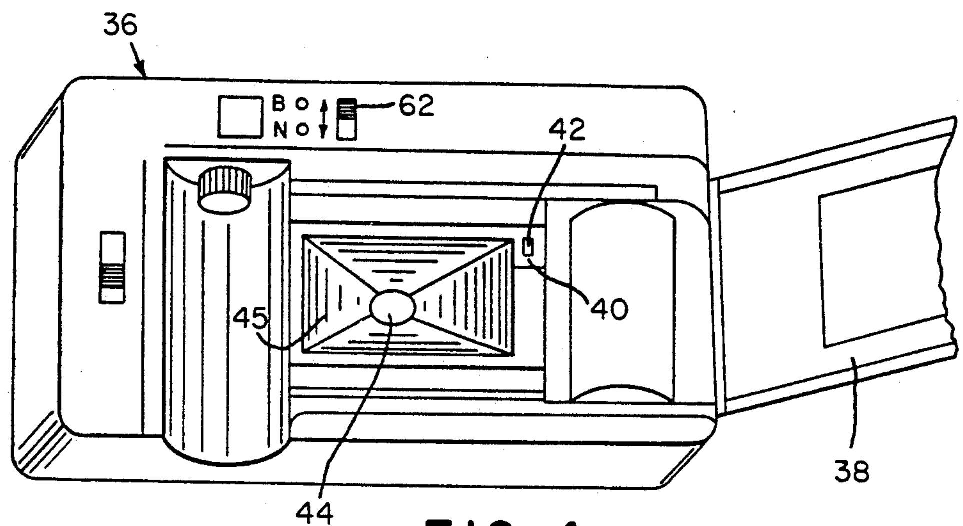
FIG. 4 is a rear view of an opened camera, in perspective, illustrating the positioning of a border fogging mask and operating switch.

Referring now to FIG. 4, a perspective view of a camera, designated generally by the numeral 36, is shown with the back door 38 pivoted open. In accordance with the invention, a border fogging mask 40 having an aperture 42 is disposed in the camera 36 between a lens 44 and filmstrip 20 (FIGS. 3, 5 and 6). The aperture 42 of the mask 40 is outside of and downstream from a light-tight compartment 45 through which the image 12 (FIGS. 1–3) is focused by the lens 44.

Figure 5:
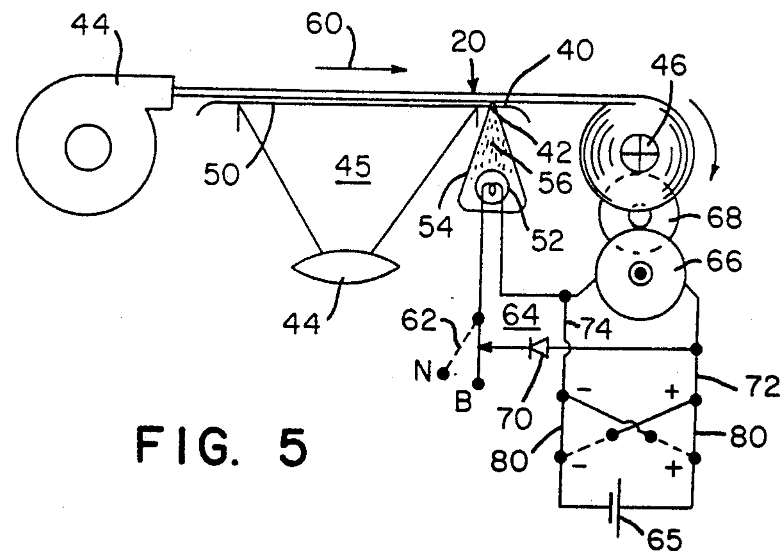
FIG. 5 is a diagrammatical top view of portions of the camera of FIG. 4 showing an illumination source fogging film in the camera during film advance.
Figure 6:
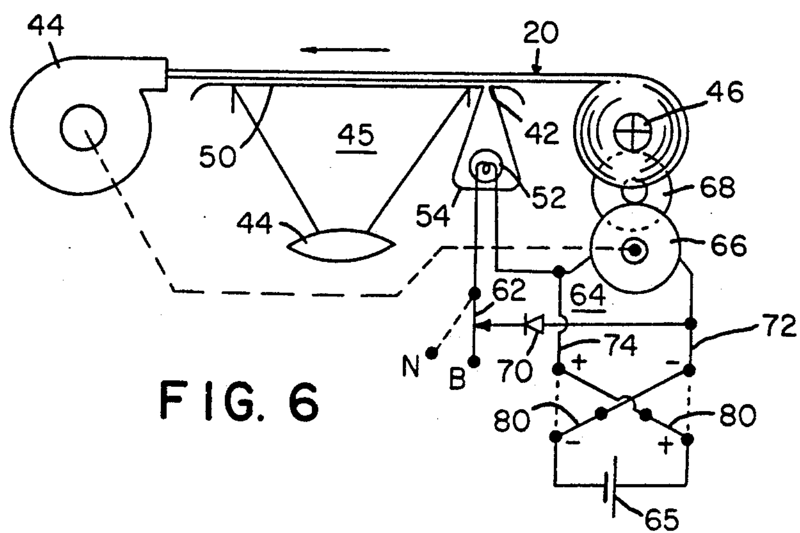
FIG. 6 is a view similar to FIG. 5, but showing the illumination source deenergized during rewinding of the film.

As is seen in FIG. 5, the filmstrip 20 is dispensed from a supply canister 44 and collected by a spool 46 as the frames of the filmstrips are exposed. After the filmstrip 20 is exposed, it is rewound, as is shown in FIG. 6, back into the canister 44.

In accordance with the principles of the instant invention, the image 12 focused by the lens 42 is shielded by walls of the light-tight compartment 45 so that the entire image is recorded on the filmstrip 20 upon opening a shutter curtain 50. The border fogging mask 40 is positioned just downstream of the light box 45, with the opening 42 overlying the upper edge of the filmstrip 20 (which becomes the lower edge of the filmstrip when the negative is developed because the image 12 is inverted on the negative). An illumination source, which may be, for example, an electric light bulb 52, is shielded within an enclosure 54 and directs light 56 through the aperture 42 in the fogging mask 40 to impinge a beam of white light on the filmstrip 20. As the filmstrip 20 advances in the direction of arrow 60 in FIG. 5, the filmstrip 20 is swept by the light 56 so as to fog the image 12 and form the white light fogged area 32 thereby producing the image 12' (see FIG. 3).

Since a border area 16 on a finished print 14 may be desired only by certain users and then only on selected prints, such as the initial print in a series, the feature is made selectable by the operator with a switch 62. As is seen in FIG. 4, the switch 62 is movable between a bordered "B" and borderless "N" position. The switch 62 allows the illumination source 52 to turn on when the filmstrip 20 advances if a border 16 is desired on the print 14.

Referring now mainly to FIGS. 5–6, switch 62 is positioned in a circuit 64. Current from a battery 65 connected to the circuit 64 is available to energize a motor 66 used to rotate the spool 46 through a gear train 68. Positioned in the circuit 64 is a diode 70, which allows current to flow in one direction and impedes current flow in the opposite direction. A switch, schematically illustrated and identified by the reference numerals 80, connects the motor 66 to the battery 65 through circuit 64. The switch 80 changes the polarity of the motor 66 when converted from its film advance mode in FIG. 5 to its rewind mode in FIG. 6. This change in polarity is applied to the circuit 64 so that line 72, which is positive during the advance mode becomes negative during the rewind mode, and line 74, which is negative during the advance mode becomes positive during the rewind mode. Upon the polarity changing from the FIG. 5 mode to the FIG. 6 mode, the diode 70 no longer conducts current from battery 65 to the illumination source 52, preventing the illumination source from emitting light 56 even if the switch 62 is closed. Consequently, if the operator wishes to have only bordered prints, the switch 62 may be left closed in its bordered position, and subsequent rolls of film will each be bordered without having to change the position of switch 62.

If a mechanical transmission shift (not shown) is used to change from an advance to a rewind mode, the switch 62 is opened by mechanical motion. Such a mechanism is not shown but may include a one-way clutch, which moves to open the switch 62 upon rotation in the rewind mode and to close the switch upon rotation in the advance mode.

3. Modifying the Field of View (FIGS. 7–10)

When one compares the borderless print 10 of FIG. 1 with the bordered print 14 of FIG. 2, it is seen that the vertical extent of the viewed image 12 is reduced when switching from the borderless to the bordered mode. Accordingly, it is desirable to alter the finder field of the camera 36, as is shown in FIGS. 7–10, so that the vertical height of the image observed by the user will always be the same as the vertical height of the image on the resulting print, regardless of the mode of the camera.

Figure 7:
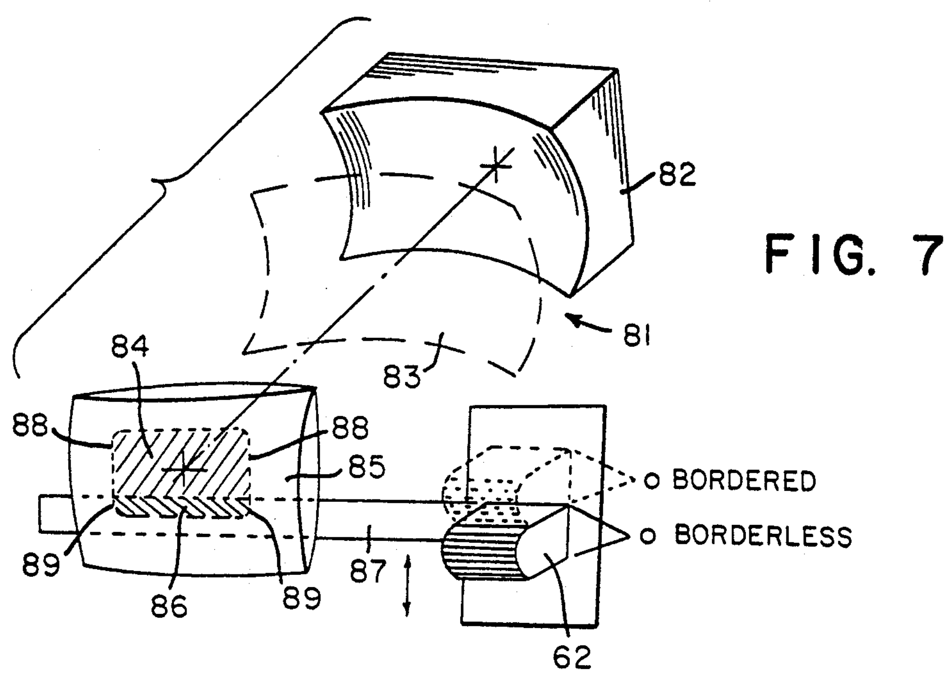
FIG. 7 is a perspective view of a reticle-type finder having a mask which is shiftable between a bordered and a borderless mode by the operating switch shown in FIG. 4.
Figure 8:
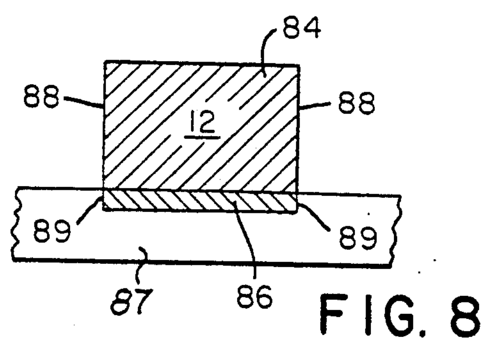
FIG. 8 is a planar view showing first and second reticles defining an image area of a borderless image.
Figure 9:
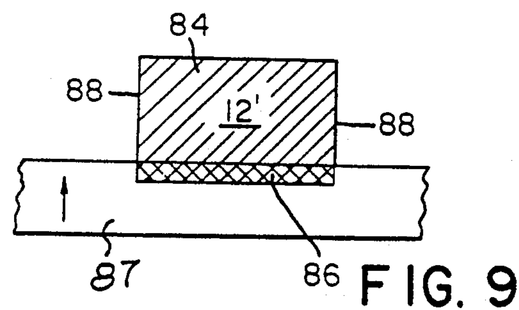
FIG. 9 is a planar view showing first and second reticles overlapped defining an image area of a bordered image.

FIGS. 7–9 illustrate an arrangement for adjusting the field of view of a camera when using a conventional reticle-type finder, designated generally by the numeral 81. The reticle-type finder 81 includes a spherical image reflecting mirror 82 and a partially reflective spherical surface 83 which images a first reticle 84 on an eyelens 85 and a second reticle 86 on a transparent member 87. For clarity, the first reticle 84 has been cross-hatched in one direction, and the second reticle 86 cross-hatched in the opposite direction. The transparent member 87 is fixed to and extends from the operating button of the mode selection 25 switch 62 (also see FIGS. 4–6). The first reticle 84 has an outline in the form of an inverted U with downwardly extending sides 88 having a height corresponding to the height of the image 12' of FIG. 2. The second reticle 86 has an outline in the form of an upwardly opening U with upwardly extending sides 89 corresponding to the height of the border 16 in FIG. 2. As is seen in FIG. 8, when the switch 62 and attached transparent member 87 are in the borderless position, the area of the second reticle 86 is added to the area of the first reticle 84 to define an image area equivalent to the image area 12 of FIG. 1. Consequently, when the camera is in the borderless mode, the reticle-type view finder 81 conveys the complete image received through the lens in the camera. As is seen in FIG. 9, when the transparent bar 87 is raised by the switch 62 to the bordered mode, the area of the second reticle 86 is overlapped by the area of the first reticle 84, lessening the height of the viewed image so that the viewed image corresponds to the height of the bordered image 12' of FIG. 2. Consequently, the operator will see through the eyelens 85 of the view finder 81 an image corresponding in height to the image 12' on print 14.

Figure 10:
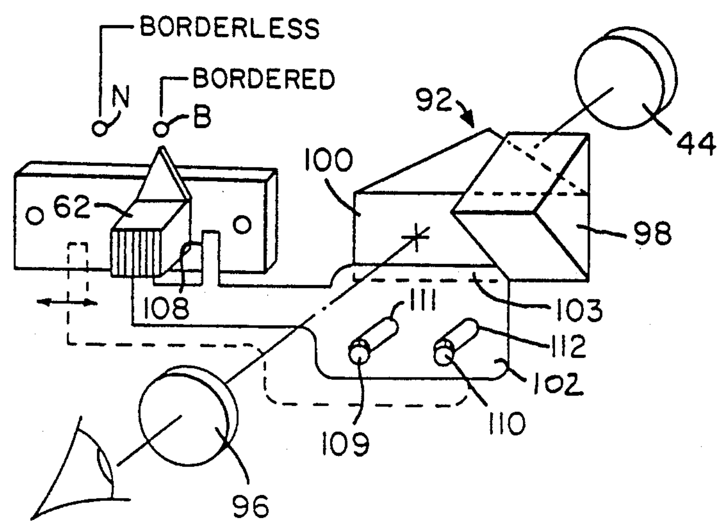
FIG. 10 is a perspective view of a real image finder with a mask shiftable between a bordered and borderless mode by the operating switch shown in FIG. 4.

Referring now to FIG. 10, where a real image view finder, designated generally by the numeral 92, is shown, the image 12 (FIG. 1) is focused through the objective lens 44 (see FIGS. 4–6) and viewed through an eyelens 96 after being reflected by a pentaprism 98 so as to appear in an image plane 100. With the real image finder 92, a mask 102 is shiftable from an operative position shown in solid lines, where the mask blocks a border area 103 of the image plane 100, to an inoperative position, shown in dotted lines where the mask drops out of alignment with the image plane. When the mask 102 is in the solid line position, blocking the border area 103 of the image plane 100, an image corresponding to the image 12' of FIG. 2 appears to the operator. When the mask 102 is in the dotted line position, out of alignment with the image plane, an image corresponding to the image 12 of FIG. 1 appears to the operator. Again, this is accomplished by shifting the switch 62 from the bordered mode position B to the borderless mode position N. In the illustrated embodiment, the mask 102 is coupled to the switch 62 by a yoke 108 and is mounted on a pair of pins 109 and 110 received in a pair of diagonal slots 111 and 112 in the mask. As the mask 102 is shifted by the switch 62 from the bordered to the borderless position, it drops out of alignment with the image plane 100 removing the border area 103 therefrom and increasing the height of the viewed image to that of the image 12 of FIG. 1.

The entire disclosures of all applications, patents and publications cited herein are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A still camera which sequentially exposes frames of a negative filmstrip, the camera comprising:

a light-tight film exposure compartment having a lens for focusing images on the frames of the filmstrip and a shutter disposed between the lens and filmstrip for exposing the filmstrip to the image;

means for indexing the filmstrip with respect to the light-tight film exposure compartment as individual frames are exposed; and means for fogging a portion of the filmstrip with light subsequent to exposing the filmstrip to the image to provide a border area proximate an edge of the filmstrip, which border appears on prints made from the filmstrip.

2. The camera of claim 1, wherein the fogging means is disposed outside of and downstream from the film exposure compartment.

3. The camera of claim 1, wherein the fogging means comprises an aperture of a width substantially equal to the width of the border area and an illumination source aligned with the aperture.

4. The camera of claim 3 wherein the illumination source is electrically energized to provide white light to fog the border area and wherein the camera further includes an electric current source for energizing the illumination source.

5. The camera of claim 4, wherein the fogging means further includes a first switch for selectively connecting the illumination source to the electric current source, wherein the border is selectively imposed on the filmstrip.

6. The camera of claim 5, further including means for directly connecting the illumination source to the electrical current source upon indexing an exposed frame of the filmstrip past the film exposure compartment.

7. The camera of claim 6, wherein the means for indexing the filmstrip comprises an electric motor driving a take-up spool for coiling the filmstrip and wherein the means for directly connecting the electric current source to the illumination source also connects the electric motor to the electric current source, whereby the illumination source forms the border on the negative filmstrip upon indexing the film.

8. The camera of claim 7, wherein the electric motor rotates in opposite directions upon switching the polarity of the current applied thereto, wherein the filmstrip is unwound from a supply spool as the filmstrip is wound on the take-up spool, wherein the electric motor drives the supply spool to wind the filmstrip on the take-up spool upon rotation in a first direction and drives the take-up spool to rewind the filmstrip thereon upon rotation in a second direction, and wherein the means directly connecting the illumination source to the electric current source includes a circuit having means therein for polarizing the circuit to conduct when current is applied to rotate the electric motor in the first direction and not to conduct when current is applied to rotate the electric motor in the second direction.

9. The camera of claim 8, wherein the camera includes a view finder presenting a viewed image of the image focused on the filmstrip and mean for altering the viewed imaging of the view finder to correspond to the image actually appearing on the filmstrip after the border has been created on the filmstrip.

10. The camera of claim 9, wherein the means for altering the viewed image of the view finder is connected to the first switch for transition between a first mode altering the viewed image to a second mode not altering the viewed image.

11. The camera of claim 8, wherein the means for polarizing the circuit is a diode.

12. The camera of claim 1, wherein the camera includes a view finder presenting a viewed image of the image focused on the filmstrip and means for altering the viewed image of the view finder to correspond to the image actually appearing on the filmstrip after the border has been created on the filmstrip.

13. The camera of claim 12 wherein the view finder includes an eyelens with a first reticle thereon defining an area equivalent to the area of a bordered image, and wherein the means for fogging a portion of the filmstrip includes a switch shiftable between a bordered and borderless position for effecting fogging of a portion of the filmstrip, the switch being connected to a second reticle defining an area equivalent to the border area for movement by the switch between a position beneath the first reticle, defining a viewed image without a border, to a position overlapping the first reticle to define a viewed image with a border.

14. The camera of claim 12 wherein the view finder includes an image plane normally displaying the image presented by the lens to the film strip and wherein the means for fogging a portion of the film strip includes a switch shiftable between a bordered and borderless position for effecting fogging of a portion of the filmstrip, the switch being connected to a mask movable by the switch between a font position overlaying the image plane blocking a portion thereof equivalent to the border area to define a viewed image with a border and a second position out of optical alignment with the image plane so as not to block a portion thereof to define a viewed image without a border.

15. An apparatus for exposing frames of a negative filmstrip exposed proximate a light-tight compartment of a camera to provide a border proximate the edge of an image on at least one photographic print made from the frames, the apparatus comprising:

an aperture positioned outside of the light-tight compartment;

an illumination source aligned with the aperture and being shielded from the light-tight compartment; and means for selectively energizing the illuminating means to fog the image on the negative filmstrip as the filmstrip advances past the aperture.

16. The mask of claim 15, further including means for energizing the illuminating source only when the filmstrip advances.

17. The apparatus of claim 16, wherein the means for energizing the illuminating source only when the filmstrip advances comprises a take-up spool driven by rotation of a shaft of an electric motor in a first direction when current is applied with a first polarity and a circuit interconnecting the source of illumination with the source of current for the electric motor whereby, when the motor is energized, the source of illumination is energized.

18. The apparatus of claim 17, wherein the motor is also connected to a supply spool for rotating the supply spool to rewind the filmstrip when current is applied with a second polarity opposite the first polarity, the circuit including means for polarizing the circuit wherein the circuit does not conduct when energized with current of the second polarity.

19. The apparatus of claim 18, wherein the means for polarizing the circuit is a diode.

20. The apparatus of claim 15, wherein the camera includes a view finder presenting a viewed image of the image focused on the filmstrip and wherein the apparatus further includes means for altering the viewed image to correspond to the image actually appearing on the filmstrip after the border has been created on the filmstrip.

21. The apparatus of claim 20, wherein the means for altering the viewed image is operatively associated with the means for selectively energizing the illuminating means, wherein, when the illuminating means is energized, the means for altering the viewed image is operative; and, when the illuminating means is not energized, the means for altering the viewed image is inoperative.

22. A method of providing frames of a negative filmstrip within a camera with a border area which facilitates the recording of indicia on an equivalent border area of photographic prints made therefrom, the method comprising the steps of:

at an imaging station within the camera, exposing at least one frame of the negative filmstrip to an image of a viewed image to create an exposed negative frame with the viewed image thereon;

advancing the negative filmstrip with the exposed negative frame out of the imaging station;

while advancing the negative filmstrip through a fogging station, fogging the exposed negative frame along a portion thereof adjacent an edge thereof to create the border area thereon.

23. The method of claim 22, further including the step of selectively fogging the exposed negative frame.

24. The method of claim 23, further including the step of energizing a lamp to perform the fogging step only upon advancing the negative filmstrip.

25. The method of claim 24 further including the step of altering the height of the viewed image, as viewed by an operator of the camera, to appear similar in height to the image on the photographic print above the border area.

26. The method of claim 24 wherein the camera includes a battery, an electric illumination source for fogging the exposed negative, a view finder and a switch electrically connecting the battery to the electric illumination source and connected to the view finder, and wherein the method includes the further step of energizing the electric illumination source with the battery and altering the height of the image conveyed by the view finder by closing the switch.

* * * * *